(12) United States Patent
Furrer (10) Patent No.: US 8,324,518 B2
(45) Date of Patent: Dec. 4, 2012

(54) INCORPORATED SWITCH, ESPECIALLY A SWITCH FOR OPENING A DOOR

(75) Inventor: Daniel Furrer, Winznau (CH)

(73) Assignee: EAO Holding AG, Olten (CH)

( * ) Notice: Subject to any disclaimer, the term of this patent is extended or adjusted under 35 U.S.C. 154(b) by 0 days.

(21) Appl. No.: 13/343,376

(22) Filed: Jan. 4, 2012

(65) Prior Publication Data

US 2012/0168288 A1 Jul. 5, 2012

(30) Foreign Application Priority Data

Jan. 5, 2011 (EP) ..................................... 11150214

(51) Int. Cl.
*H01H 9/00* (2006.01)
(52) U.S. Cl. ..................... 200/61.62; 200/293; 200/294; 200/296; 200/341; 200/515
(58) Field of Classification Search .................... 116/64, 116/68, 226; 187/395–399; 174/53–56, 174/66; 361/837; 200/17 R, 52 R, 51 R, 200/51.11, 515, 61.58 R, 61.62, 520, 293, 200/296, 302.1–302.3, 310–317, 329–331, 200/341
See application file for complete search history.

(56) References Cited

U.S. PATENT DOCUMENTS

| | | | | |
|---|---|---|---|---|
| 5,373,132 | A * | 12/1994 | Achermann et al. | 200/310 |
| 5,460,118 | A * | 10/1995 | Shea et al. | 116/226 |
| 5,803,238 | A | 9/1998 | Roza | |
| 6,713,703 | B1 * | 3/2004 | Roza | 200/520 |
| 6,828,519 | B2 * | 12/2004 | Bui et al. | 200/341 |
| 7,104,677 | B2 * | 9/2006 | Barlian et al. | 362/545 |
| 7,183,511 | B2 * | 2/2007 | Ikeda et al. | 200/314 |
| 7,244,897 | B2 * | 7/2007 | Villagrasa et al. | 200/61.85 |
| 2002/0079208 | A1 * | 6/2002 | Campana et al. | 200/310 |
| 2004/0173446 | A1 * | 9/2004 | Plana-Bague et al. | 200/314 |
| 2011/0155549 | A1 * | 6/2011 | De Jager et al. | 200/341 |

FOREIGN PATENT DOCUMENTS

| | | |
|---|---|---|
| EP | 0 749 136 A2 | 12/1996 |
| EP | 1 245 133 A | 10/2002 |
| FR | 2 931 584 A1 | 11/2009 |
| JP | 2006331809 A * | 12/2006 |

* cited by examiner

*Primary Examiner* — Michael Friedhofer
(74) *Attorney, Agent, or Firm* — The Webb Law Firm (57) ABSTRACT

A flush-mounted switch, in particular a door-opener switch, for mounting on a fastening surface, has a tubular housing and a flange which protrudes over the cover and an axially moveable button for actuating a switching member connected to the housing. The button is held in its rest position by a restoring force and can be pushed in counter to the action of this restoring force. A fastening ring affixes the door-opener switch on the fastening surface. The flange of the housing covers the fastening ring. A support ring is provided by way of which the button is lockable to the fastening ring.

20 Claims, 7 Drawing Sheets

INCORPORATED SWITCH, ESPECIALLY A SWITCH FOR OPENING A DOOR

BACKGROUND OF THE INVENTION

1. Field of the Invention

The present invention relates to a flush-mounted switch, in particular a door-opener switch, for mounting on a fastening surface, having a flange which protrudes over the cover, as seen from the direction of use of the door-opener switch, and has an axially moveable button for actuating a switching member connected to the housing, which button is held in its rest position by a restoring force and can be pushed in counter to the action of this restoring force.

2. Description of the Related Art

A flush-mounted switch of this kind as a door-opener switch having the features of the preamble of claim 1 is known from EP 0 749 136 by the applicant, which combines the advantages of an electronic switch having a short switching path with the advantages of a mechanical switch, in particular the robustness thereof.

A further switch of this kind is known from EP 1 245 133, which discloses a door-opener switch having a large push cap with a short switching path. For ease of use and approval as a switch in particular in public transport, it is frequently necessary to equip such switches with lighting elements, which are able to visually display clearance for activation and also activation itself, it being intended for these visual displays for clearance and activation to be different from one another.

SUMMARY OF THE INVENTION

On the basis of this prior art, it is an object of the present invention to configure such a known flush-mounted switch, in particular a door-opener switch, with as large a push cap as possible. In this case, a push cap is understood to mean the activation surface, that is to say that surface of the switch on which pressure leads to activation of the function.

In this case, it is a further object of the invention to configure the push cap, in spite of its size, in such a way that pressure on any desired region thereof leads to reliable activation of the function; thus, in particular, that in the case of a circular push cap, even pressure on the latter in a region close to the rim of the circle leads to reliable activation and not just pressure on the central region.

A further disadvantage of the prior art is that the size of the push cap is limited by a protruding fastening ring, which is provided to cover the inserted switch and in particular the fastening screws thereof, which, next to the activation surface of the push cap, connect the switch to a panel.

It is another object of the invention to specify a flatter switch which activates reliably and is suitable for use outside, i.e. is preferably watertight, in particular splash-watertight, and in the process protected with regard to the use of high-pressure cleaners (IP69K).

On account of the fact that the switch has a push cap, which fills virtually the entire cross section as seen from above, virtually the entire overall width of this button can be used as an activation surface. The button includes a fastening ring which is first of all fastenable to a panel by way of correspondingly provided fastening elements, in particular screws. By way of the bayonet shoulders provided on this fastening ring, it is possible, after the previously assembled door-opener switch has been positioned, to lock the latter to the panel, in that a support ring is placed on the unit consisting of the fastening ring and button unit, said support ring being latched securely with the fastening ring by way of complementary bayonet shoulders. In this case, the inner side of the support ring has a locking tab, which prevents undesired detachment of the support ring. Thus, the activation surface of the button covers the fastening elements on the panel and therefore has a larger surface area than its own basic fastening surface area.

A further object of the present invention is to increase the modularity of the door-opener switch. This is achieved in that the switch has a plug-in cable connection.

A further aim of the invention is to specify a switch that activates reliably and has a very small overall height and a large push cap. Such a large push cap having a small overall height has the problem that, in the case of a sealed configuration, which is advantageous for use outside, there is a displacement problem with the air cushion to be displaced by the pressing down of the button. This object is achieved according to the invention in that an axially moveable plastic diaphragm is provided in the cover, which plastic diaphragm can be moved with respect to the housing and thus allows the air column within the closed switch to move.

These features can be used on their own or in combination. Further embodiments are given in the dependent claims.

BRIEF DESCRIPTION OF THE DRAWINGS

Preferred embodiments of the invention are described in the following text on the basis of the drawings, which serve merely for illustration, are not to be interpreted in a limiting manner, and in which:

FIG. 4 shows a view from below of the switching mat of the door-opener switch.

DETAILED DESCRIPTION OF THE INVENTION

Figure 1:
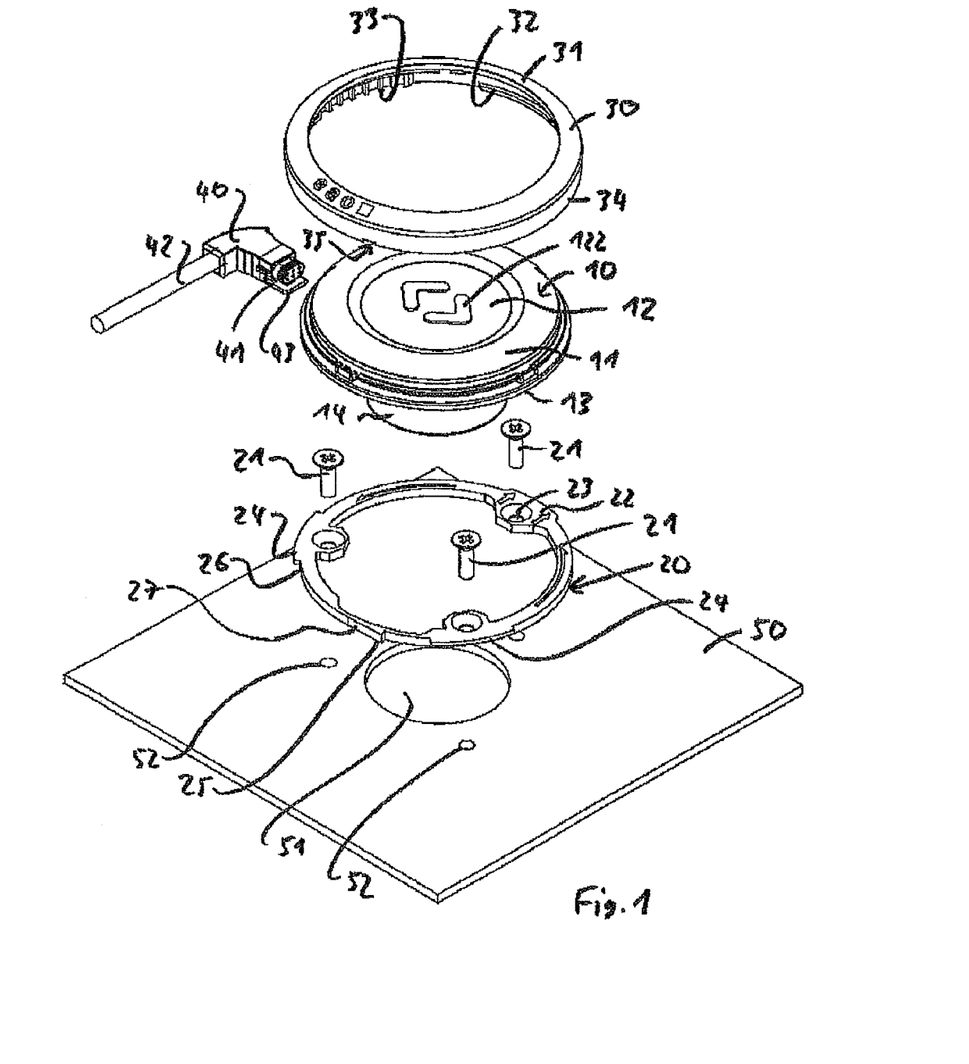
FIG. 1 shows an exploded view showing the essential elements of the mountable door-opener switch according to one exemplary embodiment of the invention in front of a panel.
Figure 2:
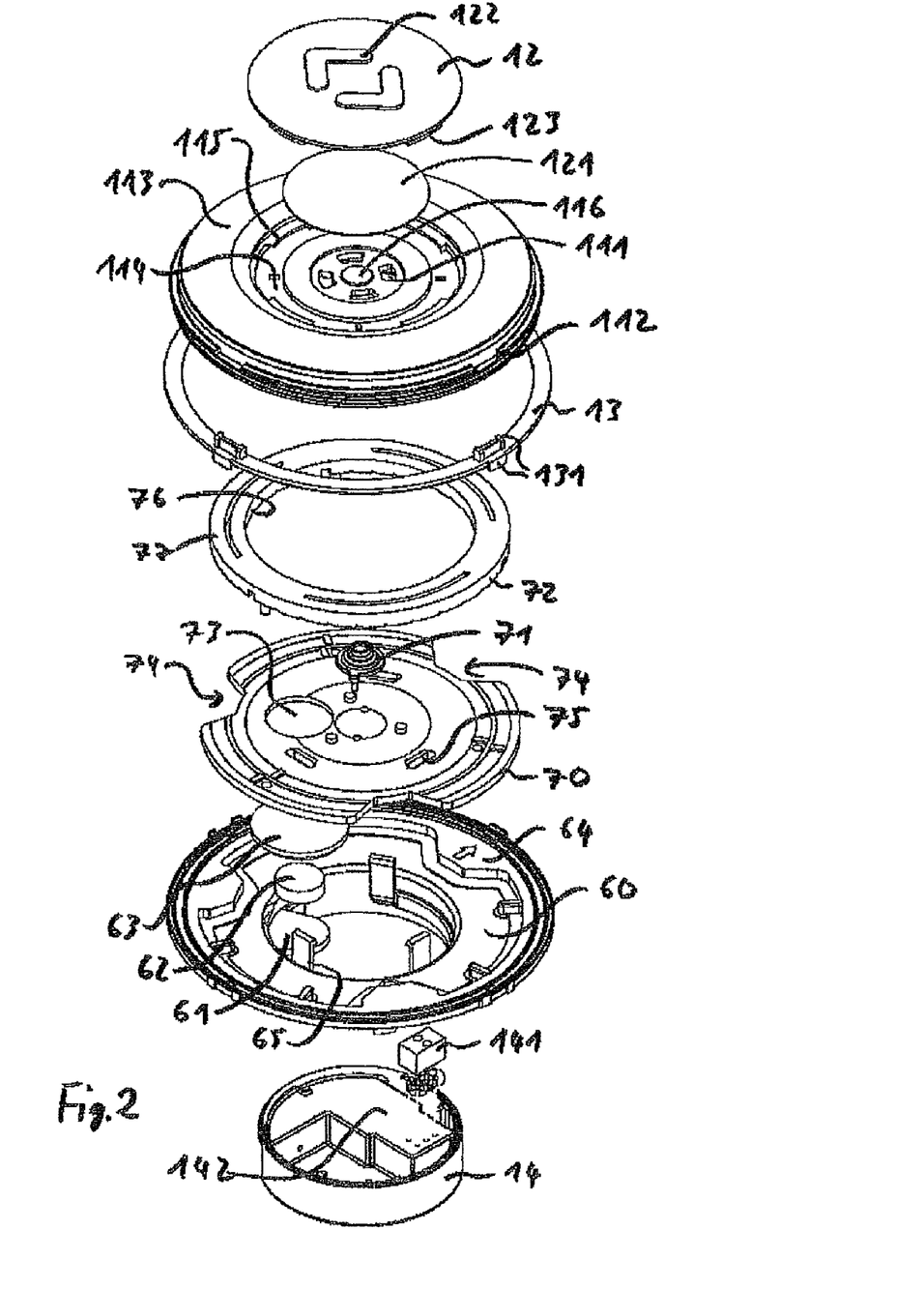
FIG. 2 shows an exploded view of the individual parts of the button of the door-opener switch according to FIG. 1 prior to mounting.
Figure 3:
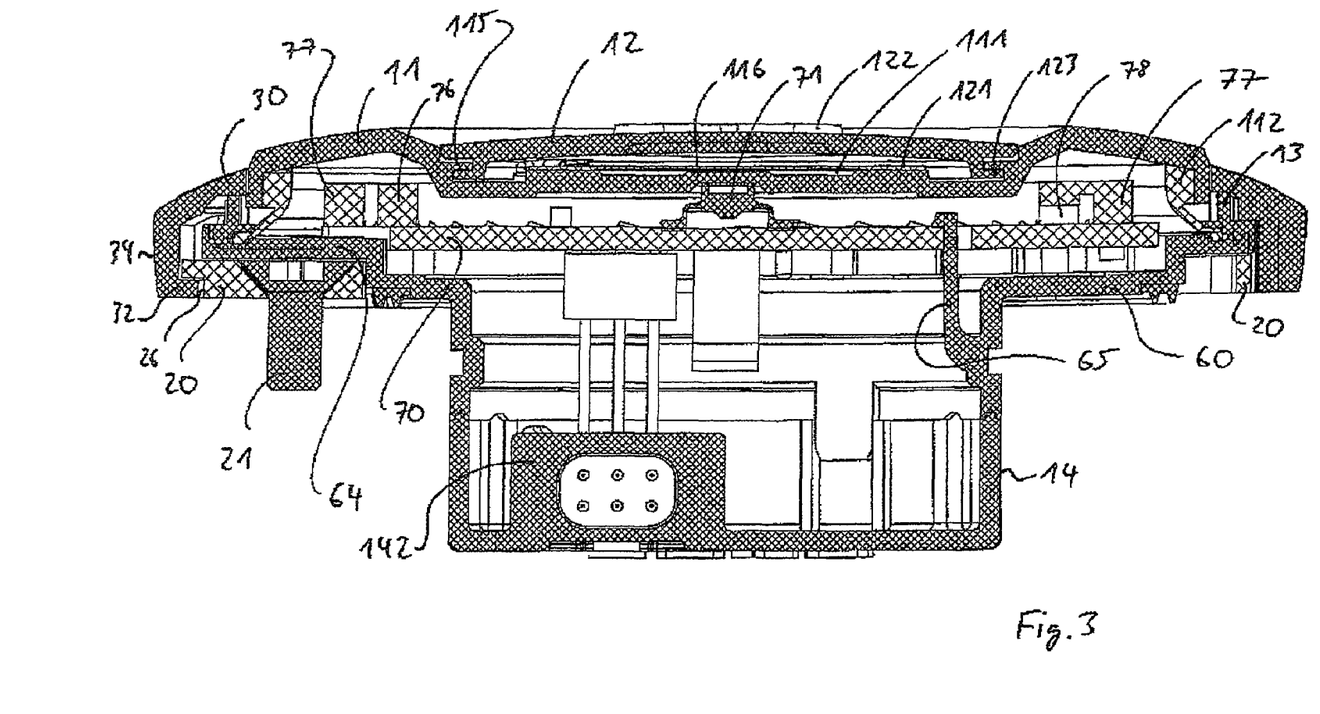
FIG. 3 shows a cross-sectional view through the door-opener switch according to FIG. 1, including fastening elements but without the panel.

FIG. 1 schematically shows an exploded view of a mountable flush-mounted switch in the form of a door-opener switch as per one exemplary embodiment of the invention in front of a panel 50 on which it is intended to be mounted, and having a plug 40 for the electrical connection. The door-opener switch thus has three subassemblies, which have been given the reference signs 10, 20 and 30 and which are described in the following text. FIG. 2 shows an exploded view of the door-opener switch according to FIG. 1, with the individual elements that make up the subassemblies. FIG. 3, to which reference is also already made in this connection, shows finally a cross-sectional view of the door-opener switch in the assembled state, with fastening screws 21, but without the panel 50 or the plug 40. Apart from opening doors, such a flush-mounted switch can also be used for a multiplicity of other switching functions, such as requesting light signals, elevators and other tasks, in which a large actuation surface is sensible and a visual response and high security against vandalism are desired.

One of the three subassemblies mentioned comprises a central button 10, which comprises an activation push cap 11, which makes up and fills the entire round extent of the button 10. In the center of the push cap 11 there is a depressed region 114, in which a symbol insert 12 can be inserted. The push cap 11 is connected to a welding ring 13, in particular by sonic welding via the seal 112. A housing 14 projects downwardly out of the subassembly, and so the button 10 has a protruding flange region 15. The flange region 15 protrudes over the cover 14, as seen from the direction of use of the door-opener switch. Its structure can be seen from FIG. 3 and FIG. 5.

The flange 15 is provided to be positioned on the fastening ring 20, and has for this purpose a complementary configuration on its underside, said fastening ring 20 previously being fastened to, for example, a panel 50 during mounting of the door-opener switch. The panel 50, which may be part of a door and is then usually aligned vertically, has a housing receptacle 51, which may be a simple through-hole or blind hole, for receiving the cover 14 with a substantially precise fit, and a number of screw holes 52. Three screw holes 52 are provided here, corresponding to three screw openings 23 in the fastening ring 20. The three countersunk screw openings 23 are provided at an angular spacing of 120 degrees to one another in orientation flanges 22 on the fastening ring. In principle, it would also be possible to make the material of the fastening ring 20 thicker in the radial direction, if there is only at least one orientation element which keeps the button 10 in a rotationally fixed manner with respect to the fastening ring 20. As can be seen in connection with FIG. 2, there are corresponding trapezoidal fastening recesses at the locations of the fastening orientation flanges 22, so that the button 10 can be inserted in a rotationally fixed manner on the fastening ring 20. To this extent, it is essential that the fastening ring 20 does not, seen radially, have a uniform internal configuration. This is achieved here by the receptacles 22 of the screw openings 23. The orientation element can also be given by a non-round cover 14, which is insertable into a then complementary receptacle 51 in the panel in precisely one or (for example in the case of polygons) in various positions.

Instead of a screw connection, the fastening ring 20 can also be designed for a rivet connection or it can in principle be attached by welding, soldering or adhesive bonding. What is essential is the alignment of the fastening ring 20 for aligning the symbol field 12 via the fastening recesses 64 of the button 10.

The fastening ring 20 has here three bayonet shoulders 24, which protrude outwardly on the flanges 22 and do not make up the entire height of the fastening ring 20. In other words, under the protruding bayonet shoulders 24 there is a lower rim 26 as far as the lower edge of the fastening ring 20. As in the case of the fastening holes 23 themselves, there can also be different shapes and numbers of these bayonet shoulders 24; there do not have to be three bayonet shoulders 24 and they do not have to be at the same angular spacing; what is essential is that it is possible to lock the button 10 by way of the support ring 30 which engages over said bayonet shoulders 24 and will be described further below. Instead of the bayonet shoulders, it is possible also to provide a snap connection, so that the fastening ring 20 is snapped on and latches in place with a click. In the case of another solution, the fastening ring 20 can also be fastened by way of laterally and radially extending screws.

The fastening ring 20 further has an outwardly directed locking tab 25, which can be brought into engagement with a complementary tab which cannot be seen in the support ring 30 in FIG. 1. By rotation of the support ring 30 in a manner corresponding to the arrows indicated on the fastening ring 20, the inner tab provided in the support ring 30 runs onto the inclined flank or ramp 27 of the locking tab 25 until it slides into the space, located behind the latter, in the receptacle and thus locks the support ring 30 with respect to the fastening ring 20. Advantageously, a lateral service opening 35 is provided in the support ring 30, it being possible by way of said service opening 35 to push back the fastening ring 20, the material of which is thin in the region of the locking tab 25 and partially the ramp 27, so that the support ring 30 can then be rotated in the opposite direction to the arrows indicated on the fastening ring 20 and can thus be released.

The support ring 30 itself has a cylindrical side wall 34, on the outer side of which said service opening 35 is provided, specifically precisely next to the tab, which projects inwardly, counterclockwise as seen from above, and which, when the switch is assembled, comes to lie next to the run-on ramp 27 and the end, the tab 25, thereof.

On its top side, the support ring 30 is provided with an inwardly directed collar 31, which is supported on a complementary shoulder 16 of the button 10. The inner edge of the collar 31 projects to the outer rim of the push cap 11, in particular in the unpressed state of the push cap 11.

Provided on the lower edge of the side wall 34 of the support ring 30 are in this case three inwardly projecting bayonet shoulders 32, which can be interlocked with the complementary shoulders 24 of the fastening ring 20; in other words, in the mounted state of the support ring 30 in which it is locked by the tab 25, the inwardly projecting bayonet shoulders 32 are located precisely opposite the lower rim 26 underneath the bayonet shoulders 24. The number and shape of these elements are therefore configured in a complementary manner. The elevations 33 serve to center the support ring 30 during mounting.

Provided on the underside of the cover 14 itself is the plug receptacle 142, which can be seen in FIG. 2 and into which the plug 40 can be plugged. The snap-action lug 43 secures the plug against undesired detachment and thus serves as a protection against falling off. In order to detach the plug connection, the lug 43 is raised and the plug withdrawn. The electrical contacts are in this case cast in the plug 40. An O-ring 41 seals the contact point with respect to penetrating moisture. The plug 40 is then connected in a conventional manner to a cable 42. In this way, it is possible to supply the door-opener switch as the abovementioned subassemblies without a pigtail, thereby increasing service-friendliness.

FIG. 2 shows in somewhat more detail an exploded view of the button 10, before the latter is assembled. The central element of the button 10 is the housing 60, which has towards the inside an opening, into which the cover 14 can be placed from below.

Advantageously, there is provided in this interior space a loudspeaker plate 61 which forms a bracket and onto which there can be placed a foam mat 62, to which the loudspeaker 63 is applied. The loudspeaker 63 then projects through a loudspeaker opening 73 in the circuit board 70. The housing 60 has, in the form illustrated in FIG. 2, the non-planar underside, which has three trapezoidal fastening recesses 64, which are then provided for the orientable locking of the cover on the fastening ring 20.

The circuit board 70 having a large diameter, which approaches the size of the push cap 11, has in this case three cutouts 75, which are provided at an irregular angular spacing, at a radial spacing which corresponds to the housing diameter, the three complementary fastening latches 65 of the cover 60, which fix the circuit board 70 in the housing 60, projecting through said cutouts 75. The angular spacings could also be provided at different spacings, in particular also equally at a spacing of 120 degrees. The circuit board 70 is otherwise preferably round having three trapezoidal recesses 74 on the circumference, said recesses 74 being complementary to the recesses 64 in the housing 60. The electric circuit is applied in a conventional manner, preferably using SMD technology, to the circuit board 70, but is not illustrated here. In order to illuminate the door-opener switch, there is provided at least one light guide 72, which can be plugged in particular onto the circuit board 70. In the case of the exemplary embodiment illustrated, it comprises, in two concentric portions 76 and 77, in each case three guide portions, which cover an angular portion of 120 degrees and are separated by LED receptacles, which cannot be seen in FIG. 2, such that three LEDs are provided for the outer portion 77 and three LEDs are provided for the inner portion 76, said LEDs activating the individual visual displays.

The push cap 11 is preferably a translucent injection molded part, resembling for example smoked glass, in a soft spring element 112, which is attached by one-component or two-component injection molding and after mounting is connected in a fixed manner via the welding ring 13 to the housing 60. The one-component or two-component execution of the connected element of push cap 11 plus axial spring element 112 ensures a sealed connection. The push cap 11 has an outer raised circular ring 113, which makes up a part of the outer actuating surface. This circular ring 113 is beveled on the inside and is adjoined by a depression 114 which has in this case three locking shoulders 115, under which there is a free space. In this case, the elevations 131 on the circular ring 113 play a role in the orientation of the elements to be connected.

Provided in the center of the push cap 11 in the illustrated exemplary embodiment are four trapezoidal openings 11, which are provided in particular for better transmission of the acoustic signal that can be generated by the loudspeaker 63. These openings 111 are dispensed with for the variant without a loudspeaker; however, they can also be dispensed with in a configuration with a loudspeaker or only three of them could be provided. In order to provide sealing with respect to the exterior space of the door-opener switch, a diaphragm film 121 is placed on the depression 114 and is attached to the latter for example by sonic welding or adhesive bonding. A planar symbol insert 12 having a symbol 122, which is printed on or is present in an incorporated raised or sunken manner, is locked in the depression 114 via the locking shoulders 115 such that corresponding bayonet elements 123 are provided on the underside of the symbol insert 12. In other words, the symbol insert 12 is placed on the depression 114 so that the bayonet shoulders 123 are arranged between the bayonet element 115 and subsequently the symbol insert 12 is rotated about the longitudinal axis of the button 10 and thus locked.

Provided as a receptacle 116 in the center of the depression 114 is an elevation, into which the switching mat 171 having a corresponding centered rubber element can be inserted from below. The switching mat 71 is illustrated in more detail in FIG. 4, which shows a view from below of the switching mat 71 of the door-opener switch. The material of the switching mat 71 is substantially flexible rubber. The switching mat 71 has a central switching mat elevation 171, which fits precisely into the complementary opening in the push cap 11, said opening being provided on the underside of the receptacle 116. This switching mat elevation 171 merges at its edges into a flange which forms the basic surface area 172 of the switching mat 71. Provided to the side of this surface area 172 are two opposing lateral projections 174, with in each case one fastening foot 175 being preferably integrally molded on each projection 174 on the side opposite the switching mat elevation 171. These fastening feet 175 are provided to be inserted into corresponding openings on the circuit board 70. Provided on the circuit board is a central first contact and a second contact, which is arranged in a preferably circular manner around this first contact at a spacing having an isolating gap, wherein the switch is activated when the two contacts are connected. For this purpose, a central recess 176 has been provided in the switching mat 71, said central recess 176 having a central electrically conductive metal plate 173 which forms the conductive switching surface. By way of a pressure at any point on the push cap 11, the central switching mat elevation 171 is pressed down; this causes the conductive switching surface 173 in the recess 176 to snap over and leads to the closing of the contact.

As a result of the use according to the invention of the fastening ring 20, it is possible to fasten the door-opener switch by means of the necessary screws 21 within the diameter of the push cap 11 and thus underneath the activation disk of the button 10 and thus under the button 10. This makes it possible to construct a smaller switch in the case of an activation diameter of the same size or to achieve a larger activation surface in the case of a switch of the same size. On account of the arrangement of the smoked-glass push cap 11, the activation surface thereof can be used directly also as a translucent surface.

On account of the depression 114 in the push cap 11 having the insert 12, it is possible to achieve better guidance for the user. Although it is possible to activate the switch at any point on the push cap 11, since activation takes place centrally via the switching mat 71, the depression provides the user more simply with a haptic confirmation of his actuation.

A problem with the switch according to this design is the pressure equalization, since, on account of the wide activation surface, even with a short switching path a considerable displacement of air takes place, and this air cannot escape in the now sealed switch. A housing which is known from the prior art and is closed off in a permeable manner by a foam material is possible for pressure equalization over a relatively long time, and thus in a door-opener switch for a mountain railroad train which travels through regions at various heights and is used there, but this element is not suitable for ensuring pressure equalization in the case of button activation, since in this case the equalization has to take place quickly, i.e. within a few milliseconds.

Figure 5:
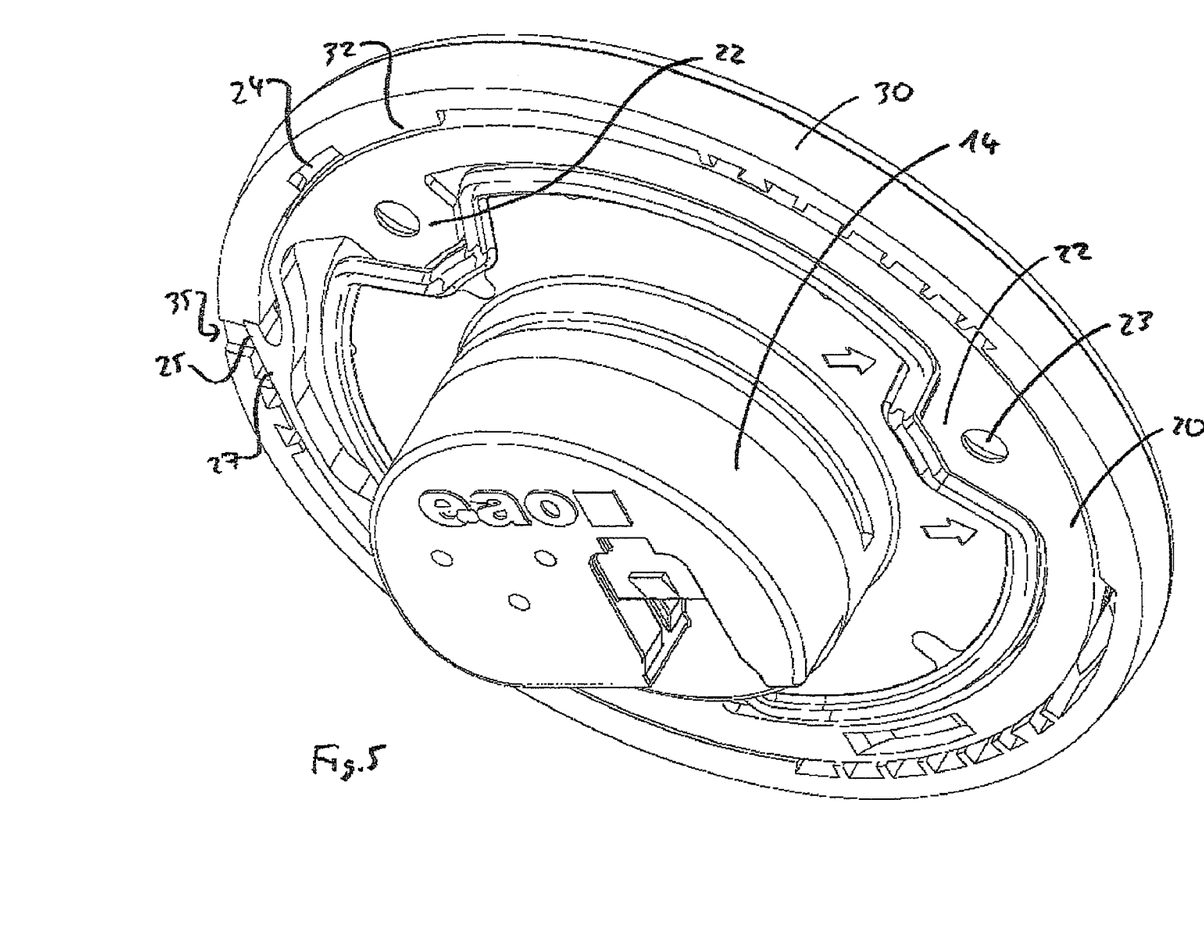
FIG. 5 shows a view from below of the door-opener switch with the fastening ring.

Therefore, according to FIG. 5, the pressure equalization means is integrated according to the invention in the cover 14, since the air displaced by the movement of the push cap 11 during switching can expand and be distributed directly within the cover 14 and thus pressure equalization with respect to the outside is ensured.

FIG. 5 shows a view from below of the door-opener switch having the fastening ring 20 and the housing 14. The support ring 30 is likewise already placed on the button 10, and so the locking thereof is directly discernible. The tab 25 is present on a protruding bayonet shoulder 32 and can be released by pressure on the service opening 35. The bayonet shoulders 32 on the circumference of the support ring 30 engage over the bayonet shoulders 24 of the fastening ring 20, which are arranged in a complementary manner. During mounting on a panel 50, the fastening screws would then project through the openings 23 into the panel.

The light guide 72 consists of two rings 76 and 77 separated by a partially executed incision, the light guide 72 being interrupted in a known manner by radially provided incisions; these provide what are known as hotspots at which the light supplied by the LEDs that emit to the sides can escape from the light guide 72 in the axial direction of the door-opener switch, in particular through the push cap 11, and is clearly discernible to the user in a manner scattered by the smoked glass, regardless of the external light conditions. Moreover, on account of the smoked-glass coloration of the push cap, the lighting contrast is increased, thereby improving the discernibility of the lighting in sunshine.

In FIG. 3, the two inner 76 and outer 77 light guides can be seen, the location of an LED being provided with the reference sign 78.

The pin strip 141 produces the electrical connection between the cover 14 and the circuit board 70.

Figure 6:
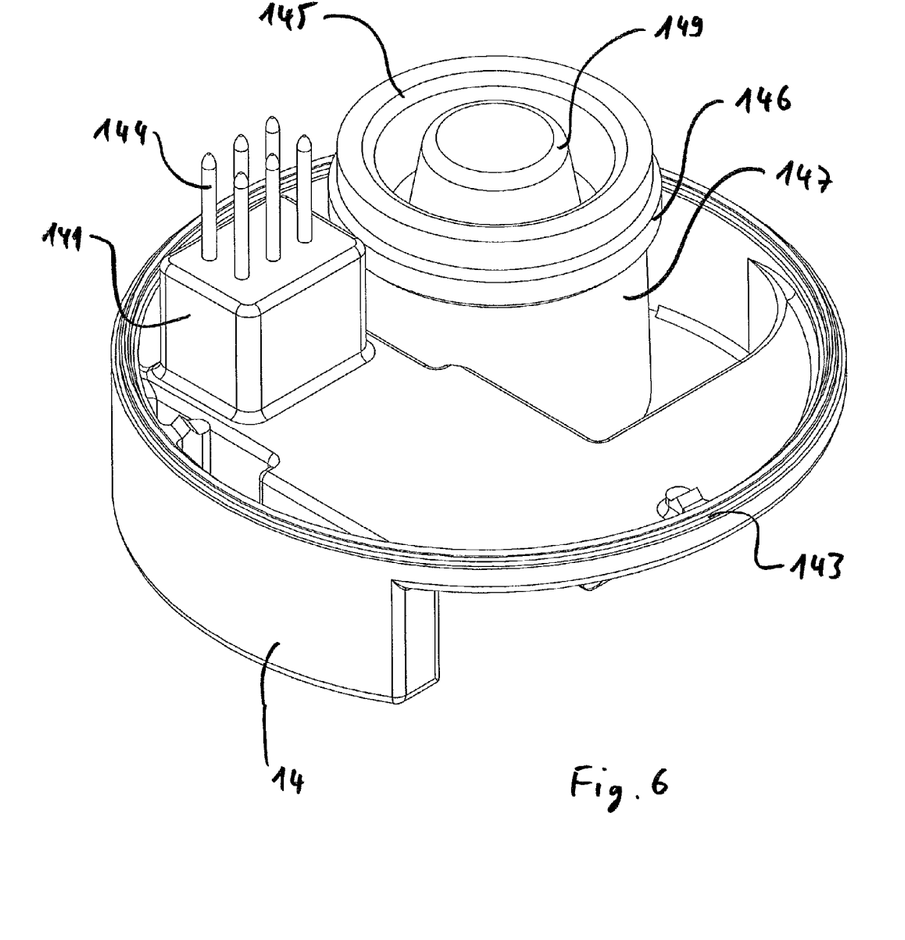
FIG. 6 shows a perspective view from above of the cover of a door-opener switch as per a further exemplary embodiment of the invention.
Figure 7:
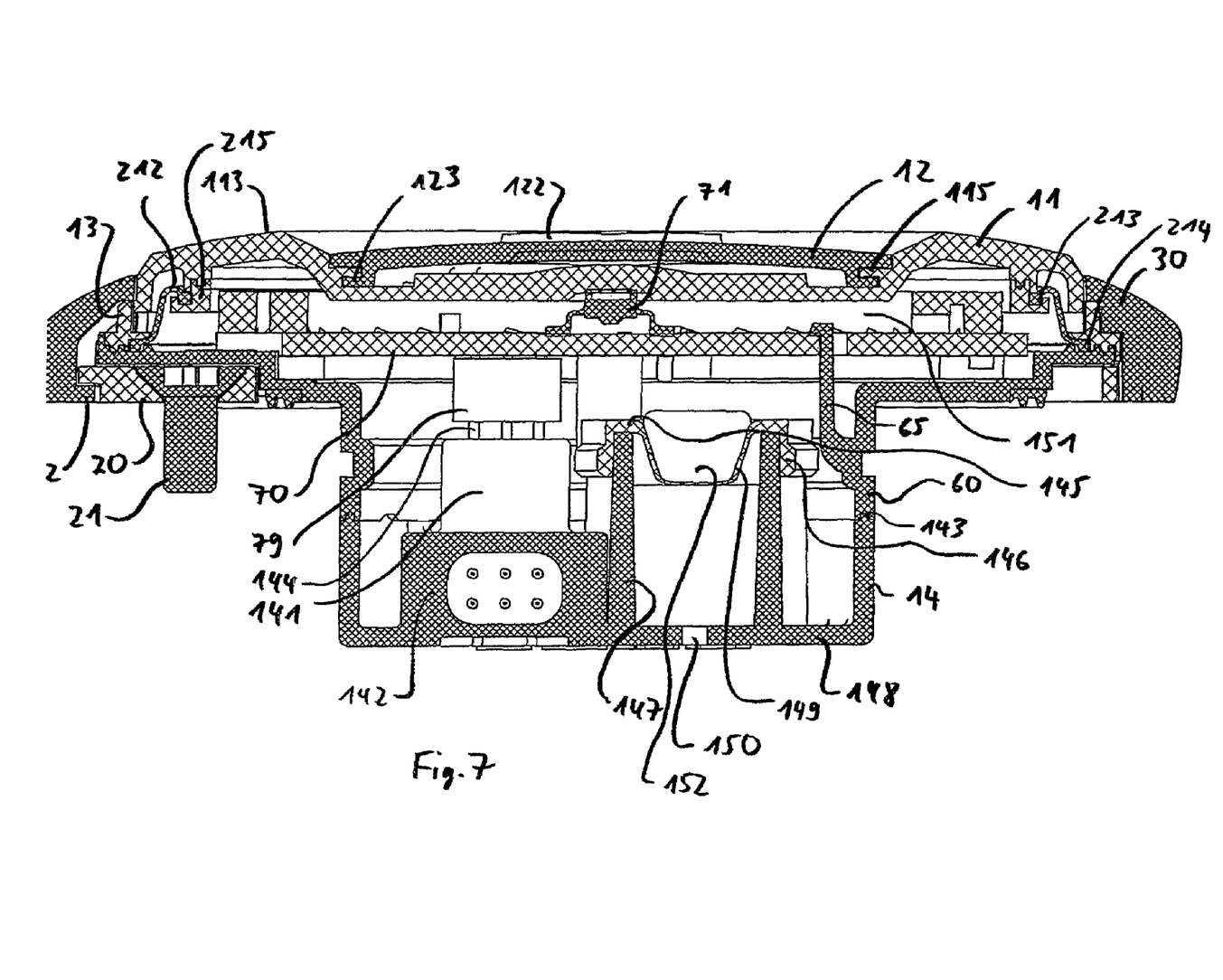
FIG. 7 shows a cross-sectional view through the assembled door-opener switch according to FIG. 6.
Figure 9:
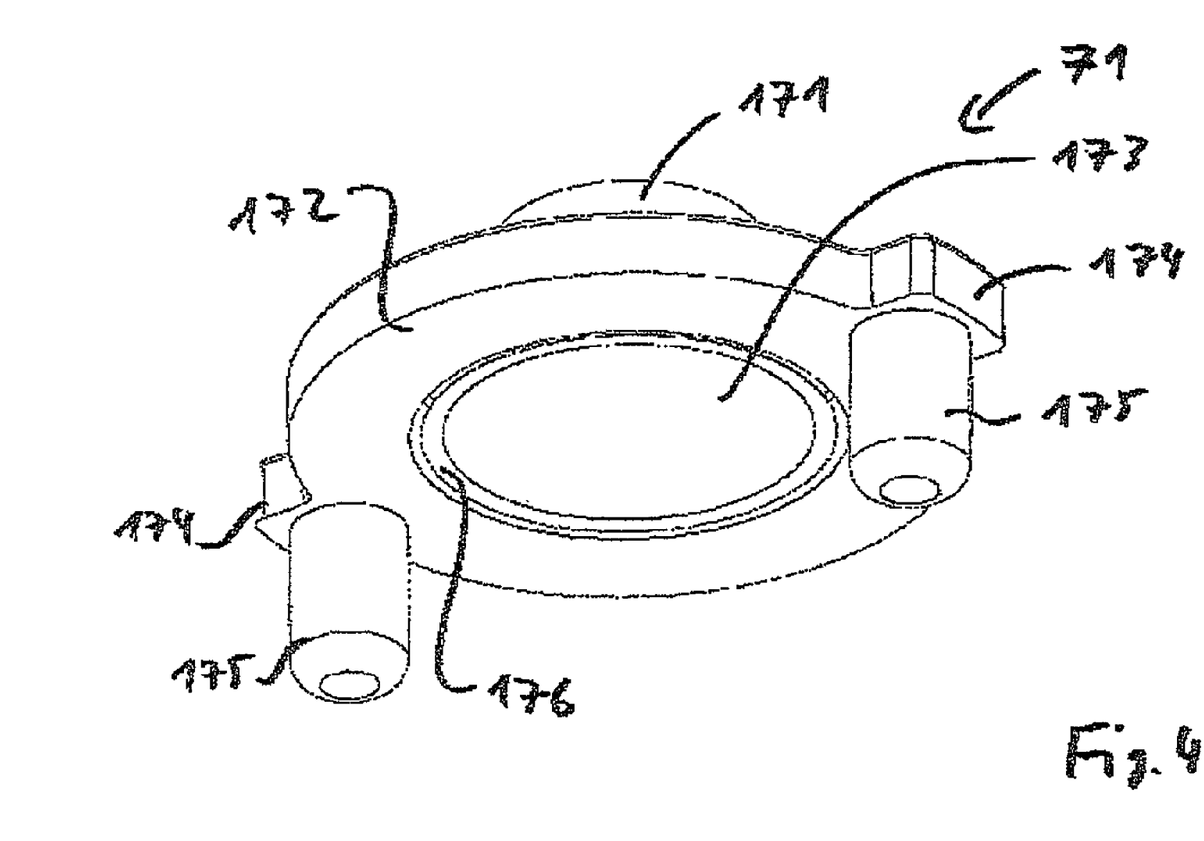

FIG. 6 shows a perspective view from above of the cover 14 of a door-opener switch according to a further exemplary embodiment of the invention. Identical features are provided in the drawings with identical reference signs. The upwardly open cover 14 has at its upper rim a circumferential connecting bead 143, which is inserted into a complementary opening in the housing 60 and is attached for example by sonic welding. A latching connection is also possible. In FIG. 7, which shows a cross-sectional view through the assembled door-opener switch according to FIG. 6, this connection can be seen.

Six contact pins 144, which are connected electrically to the circuit board 70 in a socket strip 79 fastened to the circuit board 70, emerge from the pin strip 141.

A difference from the exemplary embodiment in FIG. 1 resides in the pressure equalization diaphragm 145, which is a silicone diaphragm. Provided in the base 148 of the cover 14 is an inwardly directed hollow-cylindrical wall 147, on the free end of which the circumferential clamping bead 146 of the pressure equalization diaphragm 145 is placed in a sealing manner. It is maintained that hollow-cylindrical does not imply a circular wall 147. A hollow prism or an ellipse is also a hollow cylinder. The pressure equalization diaphragm 145 has a thin, elastic diaphragm wall, which can expand in particular between the hollow-cylindrical walls 147 of the cover 14 in the direction of a pressure equalization opening 150 which is located centrally between the walls 147 in the base 148 of the cover 14.

The function is in this case as follows. FIG. 7 shows the rest position of the push cap 11, in which the latter is spaced apart above the circuit board 70 so that there is a cavity 151 between the circuit board and the push cap and, of course, further air-containing spaces throughout housing 60, which is sealed off by the cover 14. Pressure differences between the environment and this internal cavity 151, which result when the switch is used at doors of mountain vehicles on account of the latter traveling over a period of several minutes up to an hour from a valley station to a mountain station, can be compensated by diffusion of air through the pressure equalization diaphragm 145. It is somewhat different when the switch is actuated, said actuation taking place rapidly in fractions of a second and likewise displacing the air column. On account of the flat construction of the push cap with a large actuation surface, a certain quantity of air has to be displaced despite the short switching path. This quantity of air can now flow through openings in the circuit board 70 into the region of the pressure equalization diaphragm 145 and push out the latter downwardly in the direction of the pressure equalization opening 150, since there is a direct connection to the environment via this opening 150. In this case, the sealing of the switch remains ensured. The quantity of air displaced out of the no longer existing cavity 151 forms an air column in the then expanded diaphragm cavity 152 between the walls 147 of the cover 14, held by the diaphragm wall 149 and secured by the small opening 150, so that air can escape or flow in, but no physical damage to the diaphragm need be feared. The pressure equalization diaphragm 145 can also be called a diaphragm bellows. It may have a bellows-like wall (not illustrated in the drawings). Particularly when no such bellows walls that slightly extend the cavity are present, an additional restoring force, which corresponds to the stretching of the diaphragm material, is also generated when a user releases the pressure on the push cap 11 again.

FIG. 7 shows yet further changes to the region of the push cap 11 in the exemplary embodiment with respect to FIG. 1. These changes can also be used on their own in an exemplary embodiment according to FIG. 1 and the embodiment of FIG. 1 can also be used only with a diaphragm 145 according to FIG. 6.

Instead of the circular axial spring element 112, which is fastened to the push cap 11 preferably during the production process, and is then welded to the housing 60 by way of the welding ring 13, it is also possible to provide a spring surface which is formed by the spring element 212, is in the form of a circular ring in plan view, and has an inner bead 213 and an outer bead 214. The outer bead 214 is clamped, in a similar manner to in FIG. 1, in a receptacle between the housing 60 and the welding ring 13 and the housing 60 and welding ring 13 are then preferably welded. The inner bead 213 is received in a receptacle in an additional ring 215, with in this case, too, the additional welding ring 215 and the push cap 11 then preferably being welded.

| LIST OF REFERENCE SIGNS | |
|---|---|
| 10 | Button |
| 11 | Push cap |
| 12 | Symbol insert |
| 13 | Welding ring |
| 14 | Cover |
| 15 | Flange |
| 16 | Shoulder |
| 20 | Fastening ring |
| 21 | Countersunk screw |
| 22 | Orientation flange |
| 23 | Countersunk screw opening |
| 24 | Bayonet shoulder |
| 25 | Locking tab |
| 26 | Lower edge |
| 27 | Ramp |
| 30 | Support ring |
| 31 | Collar |
| 32 | Bayonet shoulder |
| 33 | Centering ribs |
| 34 | Side wall |
| 35 | Collar |
| 40 | Plug |
| 41 | Plug strip |
| 42 | Connection cable |
| 43 | Snap-action lug |
| 50 | Panel |
| 51 | Housing receptacle |
| 52 | Screw hole |
| 60 | Housing |

-continued

| LIST OF REFERENCE SIGNS | |
|---|---|
| 61 | Loudspeaker platform |
| 62 | Foam buffer |
| 63 | Loudspeaker |
| 64 | Trapezoidal fastening recess |
| 65 | Fastening latches |
| 70 | Circuit board |
| 71 | Switching mat |
| 72 | Light guide |
| 73 | Loudspeaker opening |
| 74 | Trapezoidal fastening recess |
| 75 | Cutouts for snap locks |
| 76 | Inner light guide |
| 77 | Outer light guide |
| 78 | LED |
| 79 | Socket strip |
| 111 | Cutout |
| 112 | Axial spring element (seal) |
| 113 | Circular ring |
| 114 | Depression |
| 115 | Locking shoulders |
| 116 | Receptacle |
| 121 | Diaphragm film |
| 122 | Symbol insert |
| 123 | Bayonet shoulders |
| 131 | Orientation tab |
| 141 | Pin strip |
| 142 | Plug receptacle |
| 143 | Connecting bead |
| 144 | Contact pins |
| 145 | Pressure equalization diaphragm |
| 146 | Clamping bead |
| 147 | Wall |
| 148 | Base |
| 149 | Diaphragm wall |
| 150 | Pressure equalization opening |
| 151 | Cavity |
| 152 | Diaphragm cavity |
| 171 | Central switching mat elevation |
| 172 | Basic surface area |
| 173 | Conductive switching surface |
| 174 | Lateral projection |
| 175 | Fastening foot |
| 176 | Depression |
| 212 | Spring element |
| 213 | Inner bead |
| 214 | Outer bead |
| 215 | Intermediate ring |

The invention claimed is:

1. A flush-mounted switch, for mounting on a fastening surface, comprising a tubular housing and a cover having a flange which protrudes over the housing, as seen from the direction of use of the flush-mounted switch, and has an axially moveable button for actuating a switching member connected to the housing, which button is held in its rest position by a restoring force and can be pushed in counter to the action of this restoring force, wherein there is provided a fastening ring, by way of which the flush-mounted switch is fixable on the fastening surface, wherein the flange of the cover completely covers the fastening ring, and wherein there is provided a covering ring, by way of which the cover of the housing is lockable to the fastening ring.

2. The switch as claimed in claim 1, wherein the button of the flush-mounted switch fills a surface area of the flange such that it covers connecting surfaces of the fastening ring to the fastening surface.

3. The switch as claimed in claim 1, wherein the fastening ring has at least one orientation flange complementary to the housing.

4. The switch as claimed in claim 1, wherein the fastening ring and the covering ring have one or more complementary locking regions.

5. The switch as claimed in claim 1, wherein the push cap has a resilient rim, which is connected to the housing in a sealed manner.

6. The switch as claimed in claim 5, wherein the resilient rim is a two-component injection molded resilient rim, and wherein a welding ring provides the connection between the resilient rim and the housing in said sealed manner.

7. The switch as claimed in claim 1, wherein there is provided a resilient circular ring which is connected on one side to the push cap in a sealed manner, and which is connected on the other side to the housing in a sealed manner.

8. The switch as claimed in claim 7, wherein a first welding ring provides the connection in a sealed manner to the push cap and wherein a second welding ring provides the connection in a sealed manner to the housing.

9. The switch as claimed in claim 1, wherein the push cap has a central depression, in which a switching mat is provided centrally with respect to the internal circuit board, it being possible by way of said switching mat for a switching contact on the circuit board to be closed with the push cap pressed down at any point on the push cap.

10. The switch as claimed in claim 1, wherein the cover has a plug socket for a separate supply and signal plug.

11. A flush-mounted switch, in particular a door-opener switch, for mounting on a fastening surface, comprising a tubular housing and a flange which protrudes over the housing, as seen from the direction of use of the door-opener switch, and has an axially moveable button for actuating a switching member connected to the housing, which button is held in its rest position by a restoring force and can be pushed in counter to the action of this restoring force, wherein the button has a push cap which is connected to the housing in an axially resilient and sealed manner, and wherein on the underside of the housing there is provided a diaphragm bellows with respect to the environment.

12. The switch as claimed in claim 11, wherein a circuit board of the flush-mounted switch is provided between the push cap and the diaphragm bellows, and wherein the circuit board is provided with cutouts for pressure equalization.

13. The switch as claimed in claim 11, wherein the push cap has acoustic cutouts.

14. The switch as claimed in claim 11, wherein the push cap has a diaphragm applied in a sealing manner to the push cap.

15. The switch as claimed in claim 11, wherein the diaphragm bellows is placed in a sealed manner on a hollow cylinder that projects into the interior of the switch and the diaphragm cavity is formed between the walls of the hollow cylinder.

16. The switch as claimed in claim 15, wherein the hollow cylinder is closed off from the environment by the base of the cover and a pressure equalization opening is provided in the base.

17. The switch as claimed in claim 15, wherein the hollow cylinder has substantially at least one volume, which corresponds to the cavity volume displaced during the actuation of the push cap by the movement thereof into the interior of the switch.

18. The switch as claimed in claim 11, wherein the material of the diaphragm is silicone.

19. The switch as claimed in claim 11, wherein there is provided a resilient circular ring which is connected on one side to the push cap in a sealed manner, and which is connected on the other side to the housing in a sealed manner, wherein a first welding ring provides the connection in a sealed manner to the push cap and wherein a second welding ring provides the connection in a sealed manner to the housing.

20. The switch as claimed in claim 11 wherein the cover has a plug socket for a separate supply and signal plug.

* * * * *